US008494481B1

(12) United States Patent
Bacco et al.

(10) Patent No.: US 8,494,481 B1
(45) Date of Patent: Jul. 23, 2013

(54) MOBILE ALARM DEVICE

(75) Inventors: Edward M. Bacco, Bainbridge Island, WA (US); Katrin Korten, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/304,206

(22) Filed: Nov. 23, 2011

Related U.S. Application Data

(60) Provisional application No. 61/554,782, filed on Nov. 2, 2011.

(51) Int. Cl.
*H04M 11/04* (2006.01)

(52) U.S. Cl.
USPC ..................... 455/404.1; 455/404.2; 455/410; 455/456.1; 455/457; 340/571; 340/573.1

(58) Field of Classification Search
USPC . 455/404.1, 404.2, 410, 456.1, 457; 340/571, 340/573.1
See application file for complete search history.

(56) References Cited

U.S. PATENT DOCUMENTS

| | | | | |
|---|---|---|---|---|
| 5,614,887 | A * | 3/1997 | Buchbinder | 340/573.1 |
| 6,430,613 | B1 * | 8/2002 | Brunet et al. | 709/223 |
| 2004/0162880 | A1 * | 8/2004 | Arnone et al. | 709/206 |
| 2004/0189460 | A1 * | 9/2004 | Heaton et al. | 340/500 |
| 2004/0212505 | A1 * | 10/2004 | Dewing et al. | 340/573.1 |
| 2005/0162267 | A1 * | 7/2005 | Khandelwal et al. | 340/506 |
| 2007/0133756 | A1 * | 6/2007 | Graves et al. | 379/37 |
| 2009/0265576 | A1 * | 10/2009 | Blum | 714/2 |
| 2009/0286503 | A1 * | 11/2009 | Ichinose et al. | 455/404.1 |
| 2010/0030399 | A1 * | 2/2010 | Zellner et al. | 701/2 |
| 2010/0081411 | A1 * | 4/2010 | Montenero | 455/404.2 |
| 2010/0248679 | A1 * | 9/2010 | Oei et al. | 455/404.1 |
| 2010/0325047 | A1 * | 12/2010 | Carlson et al. | 705/44 |
| 2011/0071880 | A1 * | 3/2011 | Spector | 705/9 |
| 2011/0105854 | A1 * | 5/2011 | Kiani et al. | 600/300 |
| 2012/0218102 | A1 * | 8/2012 | Bivens et al. | 340/539.13 |

OTHER PUBLICATIONS

Michael Armbrust, et al., "Above the Clouds: A Berkeley View of Cloud Computing," UC Berkeley Reliable Adaptive Distributed Systems Laboratory, Feb. 10, 2009, 23 pages.

(Continued)

*Primary Examiner* — Jean Gelin
*Assistant Examiner* — Qun Shen
(74) *Attorney, Agent, or Firm* — Robert C. Kowert; Meyertons, Hood, Kivlin, Kowert & Goetzel, P.C.

(57) ABSTRACT

A method of responding to alarm includes receiving an alarm message from an alarm system at a site. The alarm message may indicate that an alarm has been triggered at the site. In response to receiving the alarm message, a responder may be identified to respond to the alarm. A call message may be automatically sent over a network to a mobile alarm device in the possession of the responder. A message may be received back from the mobile alarm device accepting the call message for the alarm. In some embodiments, the responder's response to the alarm (for example, time to arrive at the alarm, time to clear the alarm) is automatically timed and monitored based on messages received from the responder over the mobile alarm device.

20 Claims, 12 Drawing Sheets

OTHER PUBLICATIONS

Krishnan Subramanian, Gluster Introduces Scale-Out NAS Virtual Storage Appliances for VMware and AWS, CloudAve, Feb. 9, 2011, 3 pages.

Stephen Lawson, IDG News, "Gluster Pushes Storage Software to VMware, Amazon," PCWorld, Feb. 7, 2011, 3 pages.

Stephanie Balaouras for Infrastructure & Operations Professionals, How the Cloud Will Transform Disaster Recovery Services, Forrester, Jul. 24, 2009, 14 pages.

Yang Liu, et al, "Low-cost Application Image Distribution on World-wide Cloud Front Server," IEEE INFOCOM 2011 Workshop on Cloud Computing, Jun. 23, 2011, 6 pages.

Amir Epstein, et al., "Virtual Appliance Content Distribution for a Global Infrastructure Cloud Service," IEEE INFOCOM 2010, May 6, 2010, 9 pages.

* cited by examiner

MOBILE ALARM DEVICE

PRIORITY INFORMATION

This application claims benefit of priority to U.S. Provisional Patent Application No. 61/554,782 filed Nov. 2, 2011 titled "Mobile Alarm Device," which is hereby incorporated by reference herein in its entirety.

BACKGROUND

Many building and facilities, such as industrial facilities, data centers, retail stores, and residences, are equipped with access control/intrusion detection systems. In a typical system, alarms from a system are routed over a computer network to a monitoring post, such as a command center or a field-based alarm monitoring post. The monitoring post may be staffed by monitoring personnel who are assigned to monitor computer systems. The computer systems may display to the monitoring personnel the nature and location of the alarms as they are displayed or annunciated. The displayed information may be used by the monitoring personnel to identify who should be contacted or dispatched to investigate the cause of the alarm.

The person tasked with responding to an alarm may be commonly referred to as the alarm responder, or simply the "responder". Once tasked with investigating the cause of the alarm, the responder may proceed to the location of the alarm event, determine the cause of the alarm, and report the responder's findings back to the monitoring post.

In many systems, remote identification and assessment of an alarm, dispatch to a responder to the alarm, and clearing of the alarm, requires the intervention of a person at many stages in the process. For example, a monitor may need to interpret the nature of the alarm, identify the appropriate person to respond to the alarm, send a notice to the appropriate person. The monitor may wait for acknowledgement that the responder has accepted the alarm and also for subsequent notices that the responder has arrived at the site of the alarm system, cleared the alarm, etc. The monitoring personnel's activities may thus involve a significant amount of human resources. In addition, each one of the interventions introduces the possibility of a defect into the process, for example, if monitoring personnel misidentify the nature or location of the alarm, contact the wrong responder, or miscommunicate the cause of the alarm. Moreover, in many systems, there may not be a complete record of the time it takes to complete an alarm lifecycle, which limits the ability to measure and improve process times. Moreover, monitoring personnel may have limited capacity to monitor whether a responder is overdue from returning from the location of an alarm. An overdue responder may indicate that person has encountered a serious situation involving the responder's personal safety.

Some network-based alarm systems may lack the ability to easily mask an alarm. In some systems, for example, masking an alarm may involve programming a device, such as a door contact, to not generate an alarm when the door has been opened and while the security system is active. Such programming may have to be completed by a trained person with high level access permissions into the programming of the security system.

Figure 1:
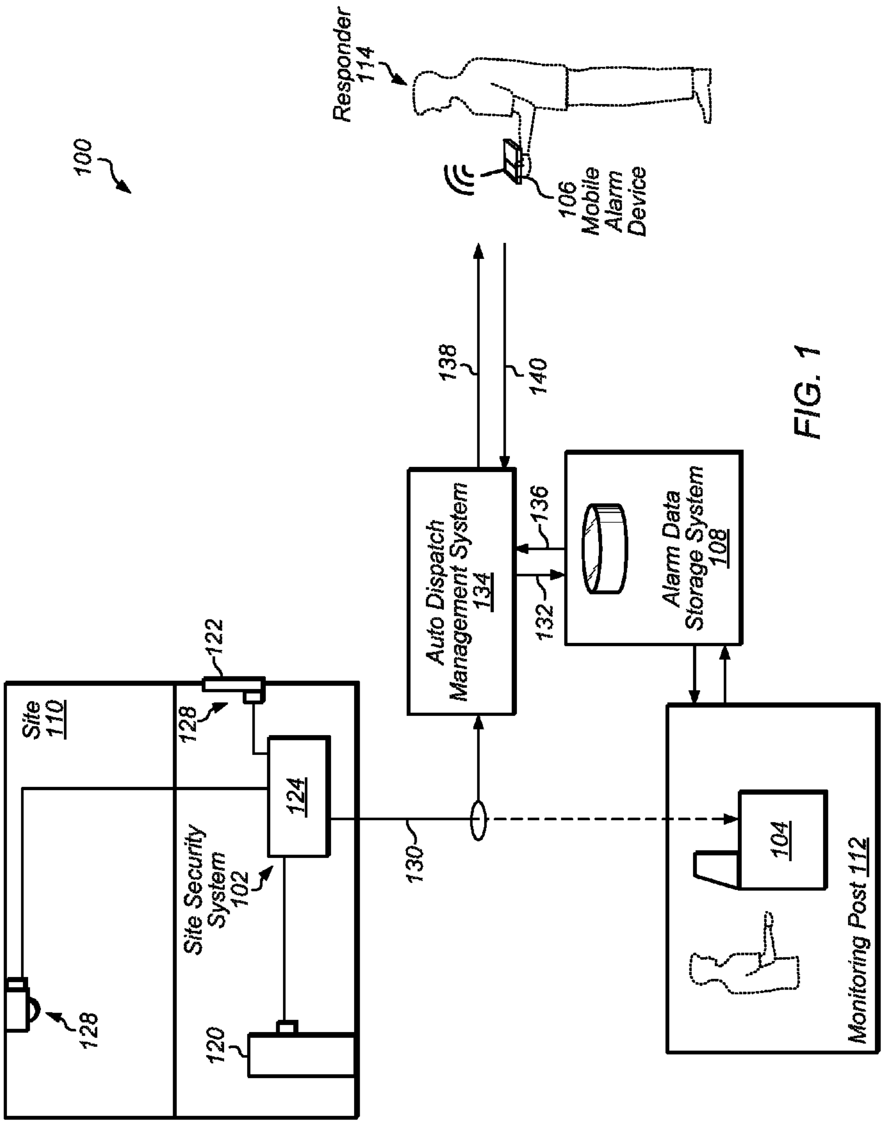
FIG. 1 illustrates a flow of messages from a site alarm system to a responder's mobile alarm device according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a mobile alarm device and systems and methods for responding to alarms are described. According to one embodiment, a method of responding to an alarm includes receiving an alarm message from an alarm system at a site. The alarm message may indicate that an alarm has been triggered at the site. In response to receiving the alarm message, a responder may be identified to respond to the alarm. A call message may be automatically sent over a network to a mobile alarm device in the possession of the responder. A message may be received back from the mobile alarm device accepting the call message for the alarm. In some embodiments, the responder's response to the alarm (for example, time to arrive at the alarm, time to clear the alarm) is automatically timed and monitored based on messages received from the responder over the mobile alarm device. The alarm may be automatically escalated (for example, a monitoring post notified) based on predetermined time criteria.

According to one embodiment, a method of masking an alarm at a site includes receiving a mask request message from a mobile alarm device. The mask request message may include a request to mask one or more alarm sensors at the site. In response to receiving the mask request message, the alarm sensors may be masked. In some embodiments, the alarm sensors are masked for a predetermined period of time.

According to one embodiment, a mobile device includes a processor, a portable case coupled to the processor, and a display coupled to the processor. The mobile device may send and receive messages relating to an alarm at a site.

As used herein, an "alarm" includes any signal, message, or indicator. Examples of conditions or events that may trigger an alarm include a property invasion, security breach, system malfunction, fire, water leak, loss of utilities (such as an electrical power loss), or hazardous material leak.

As used herein, a "mobile alarm device" means a mobile device that can receive messages relating to alarms. A mobile alarm device may be assigned to, or in the possession of, one or more responders, one or more supervisors, or other personnel.

As used herein, a "mobile device" includes any computing device that does not require a physical connection to a fixed location (such as a power cable or I/O cable plugged into a wall receptacle or jack) to be operated. Examples of mobile devices include a smart phone, a tablet computer, a notebook computer, a pager, a vehicular communication device, a cellular telephone, or a mobile networking device.

As used herein, a "monitoring post" means a location, station, or facility where alarms can be monitored. A monitoring post may include computer systems for monitoring alarm systems located at one or more sites. A monitoring post may be staffed by one or more persons. A monitoring post may transmit and receive information relating to alarms and related systems over a computer network.

As used herein, a "responder" means a person who can respond to an alarm at a site.

As used herein, a "responder mobile alarm device" means a mobile alarm device that is assigned to, or in the possession of, one or more responders.

As used herein, "site" means a physical site, physical location, facility, or building or set of buildings. Examples of sites include a data center campus, office facility, fulfillment center, retail mall, or school campus. A site may include two or more buildings within a physical area. A site may be indoors, outdoors, or a combination thereof. Sites may be any of various public, private, or semi-private locations. Examples of a site include an apartment complex, a computing facility, a park, a shopping center, a sports venue, a factory, a business office, or a residence.

As used herein, a "call message" means a message that requests, summons, directs, or commands an action to be carried out by one or more persons, or indicates a need for an action by one or more persons.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc—read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, "solid state memory" includes memory that does not have moving parts. Examples of solid-state memory include electrically erasable programmable read-only memory (EEPROM), dynamic random-access memory (DRAM), and flash memory. Flash memory may include, for example, NAND flash and NOR flash.

As used herein, "solid state storage device" means a device that includes solid state memory that can be used to store data. Examples of solid-state storage devices include flash drives, USB thumb drives, SD cards, micro SD cards, Memory Stick, SmartMedia, CompactFlash, and MultiMediaCard (MMC).

In various embodiments, one more steps in the lifecycle of an alarm are performed automatically. In some embodiments, an alarm from an alarm system at a site is sent to a mobile alarm device of a responder over a network. In some embodiments, a responder is assigned automatically and a call message sent to the responder's mobile alarm device automatically, without any human involvement (such as monitoring post personnel).

A responder's reaction and progress in response to the alarm may be monitored automatically. The responder's actual response may be measured against predetermined criteria. For example, a time limit may be set on how long it takes for the responder to acknowledge the alarm. If the assigned responder's actual response does not meet any of the criteria, the alarm event may be escalated. Escalation may include, for example, notifying a person at a monitoring post that a time limit for clearing an alarm has been exceeded. In certain embodiments, escalation may include calling in special personnel or public servants, such as police, fire department, or emergency medical response personnel.

FIG. 1 illustrates a flow of messages from a site alarm system to a responder's mobile alarm device according to one embodiment. System 100 includes site security system 102, monitoring post system 104, mobile alarm device 106, and alarm data storage system 108. Site security system 102 is located at site 110. Monitoring post system 104 is located at monitoring post 112. Mobile alarm device 112 may be assigned to, and in the possession of, responder 114, who may be located anywhere. In some embodiments, responder 114 and mobile alarm device 106 are located at the site (for example, at a guard station) at the time the alarm is triggered.

Site 110 includes access points include door 120 and window 122. Site security system 102 includes alarm control unit 124, alarm control panel 126, and alarm sensors 128. Alarm sensors 128 may of any of various types. Examples of alarm sensors that may be employed in site security system 102 include contact sensors, door switches, windows switches, optical sensors, smoke detectors, fire detectors, laser sensors, inertial sensors, motion detectors, and infrared sensors.

Monitoring post 112 includes equipment and facilities for monitoring and managing alarms, such as alarms that issue from site security system 102. Monitoring post 112 may also monitor security systems at any number of sites in addition to site 102.

Alarm data storage system 108 may hold one or more databases that include information relating to site security systems, responders, mobile alarm devices, and monitoring posts. Information stored in the database(s) may include, for example, responsibilities of particular responders monitoring codes, responder shift information, communication information (for example, IP addresses for mobile alarm devices), authentication data, service level data for sites, and police/fire department contact information. In some embodiments, the database is centralized at one location. In other embodiments, the database is decentralized or distributed among any number of locations. In certain embodiments, a database relevant for alarms at a particular site is stored on a data storage device at the site. In one embodiment, the data storage device is a solid state storage device. In certain embodiments, all or a portion of the database for an alarm system is located in cloud storage.

Triggering of an alarm at site 110 may generate a sequence of messages among the various devices in system 100. Any of such messages may be sent over one or more computer networks, such as a public or private network.

When an alarm is triggered at site 110, site security system 102 may issue alarm message 130. Alarm message 130 may be sent to monitoring post 112. Auto dispatch management system 134 may detect and intercept alarm message 130. Alarm message may include information such as: the location of the alarm; the location of the sensor; and the nature of the alarm. The nature of the alarm may include conditions such as: window sensor open, smoke detected, motion detected.

In response to detecting alarm message 130, auto dispatch management system 134 may send a query 132 to a database on alarm data storage system 108 to retrieve information for responding to alarm message 130. Information from the query may be used to dispatch the alarm to a responder. Information for the response may include: (1) the name, location, and status (for example, available, unavailable) of a responder who is responsible for any alarms at the site at the time the alarm was triggered; (2) address information for the responsible responder's mobile alarm device. For example, any alarms on Tuesday morning at Data Center A may be the responsibility of Michael Gonzales, who carries mobile alarm device at IP 123.156.998.222, etc.

In some embodiments, information retrieved from a database may include information relating to two or more responders. An automatic dispatch system may automatically select a responder based on predetermined criteria. For example, the dispatch may be automatically sent to responder who is nearest to the site at the time of the alarm. In some embodiments, a responder is selected by the system based on characteristics of the responder, such as experience, qualifications, or workload.

Information from the database may be returned by way of data message 136 to auto dispatch management system 134. Based on the information contained in data message 136, auto dispatch management system 134 may send call message 138 to mobile alarm device 112. Call message 138 to mobile alarm device 106 may signal responder 114 of the alarm. A signal to responder 114 may be provided by way of a visual display, audible alarm, device vibration, or combinations thereof.

In some embodiments, an alarm message from a site may bypass a monitoring post a go directly to a responder mobile alarm device without human involvement in making the dispatch. A call message may be sent directly to a responder mobile alarm device automatically with information concerning the nature and location of the alarm. For example, in certain embodiments, when alarm message 130 is intercepted by auto dispatch management system 134, no message may be received at monitoring post 112. In other embodiments, a monitoring post system receives a notification of the alarm, but does not have to take any action to dispatch a responder.

In certain embodiments, monitoring personnel at a monitoring post can override an automatic dispatch. For example, auto dispatch management system 134 may initially dispatch an alarm to Responder A. Monitoring personnel at monitoring post 112 may reassign the alarm to Responder B, cancel or suspend the alarm, or otherwise intervene in managing a response to the alarm. In some embodiments, monitoring personnel intervene only if criteria for responding to the alarm (such as timely arrival of a responder at the location of the alarm) have not been met.

Although auto dispatch management system 134 is depicted in FIG. 1 as a discrete element, an auto dispatch system may be incorporated into other elements of a system. For example, automatic dispatch and response monitoring may be performed within monitoring post system 104. In some embodiments, auto dispatch management system 134 is implemented as an Application Program Interface ("API"). In certain embodiments, automatic dispatch and response monitoring are performed in a cloud computing system.

In the embodiment shown in FIG. 1, only one mobile alarm device, only one responder, and only one site for illustrative purposes. A system may, nevertheless, include in various embodiments any number of various components, including any number of sites, site security systems, mobile alarm devices, and monitoring posts. In some embodiments, alarms for a single site may be sent to two or more different mobile alarm devices, each in the possession of a different responder. In some embodiments, a single responder may be responsible for two or more different sites. For example, one responder may be responsible for alarms occurring at any bank branch within a 5-mile radius of a particular location.

In various embodiments, a system monitors a responder's response to an alarm based on information exchanged with the responder by way of a responder mobile alarm device. For example, responder 114 may use mobile alarm device 106 to send response messages 140 back to auto dispatch management system 134. Response messages 140 may be sent, for example, to acknowledge and accept an alarm, to indicate arrival at the site, or indicate that an alarm has been cleared. In some embodiments, automatic timers track the time it takes to complete one or more specific steps in the response process against an adjustable set of predetermined triggers. Responders may interface with a security system by way of responder hand-held device, without communicating with monitoring personnel at a monitoring post.

In various embodiments, some or all of the messages sent to or from a mobile alarm device are encrypted. Encryption may accomplished by any of various encryption techniques and standards.

Figure 2:
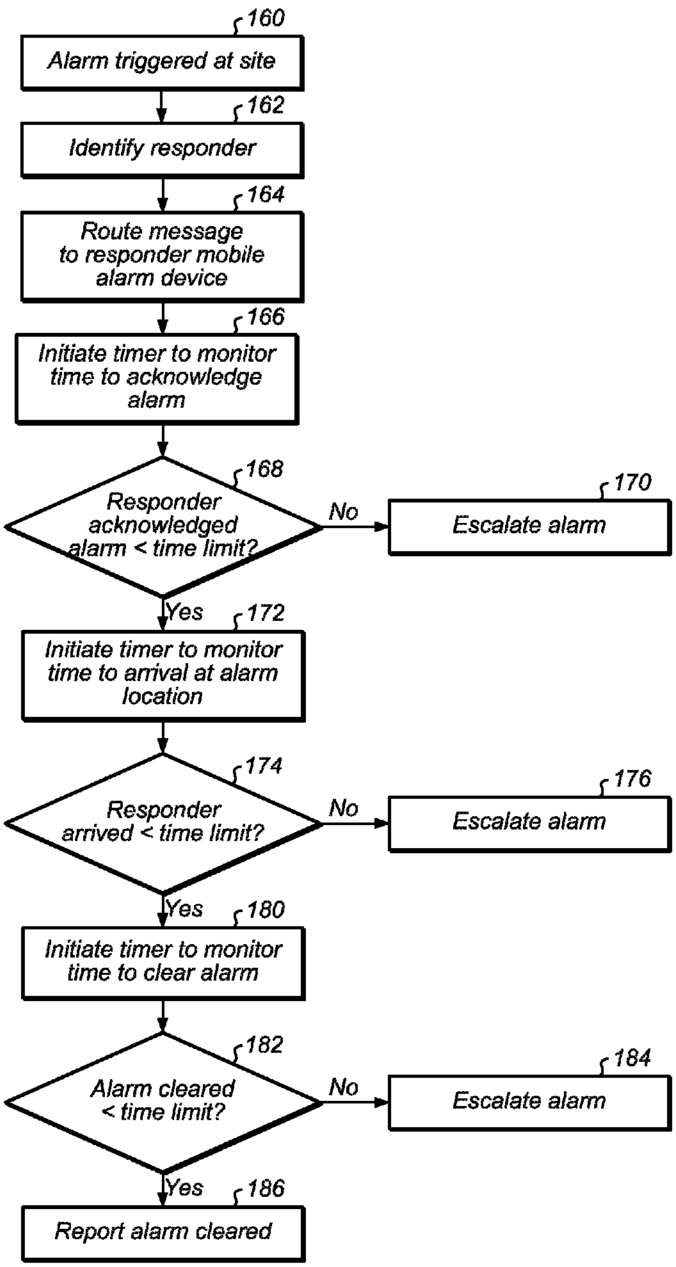
FIG. 2 illustrates one embodiment of monitoring a response to an alarm using a responder mobile alarm device that includes timing of response actions.

FIG. 2 illustrates one embodiment of monitoring a response to an alarm using a responder mobile alarm device that includes timing of response actions. At 160, an alarm is triggered at a site. At 162, one or more mobile alarm devices or responders are identified. The identified responder may be a person who is responsible for responding to alarms for the site, during the time period in which the alarm was triggered.

At 164, an alarm message is automatically routed to the identified responder mobile alarm device. The responder with the mobile alarm device may be signaled by the device (for example, visually or audibly) that an alarm has been triggered. The mobile alarm device may provide information to the responder regarding the alarm, including the location of the alarm, the nature of the alarm, and the time the alarm was triggered. In some embodiments, the response is routed without any action by personnel at a monitoring post.

At 166, a timer is triggered to monitor the time it takes the responder to acknowledge the alarm. Acknowledgement may occur when the responder, utilizing a mobile alarm device, accepts the alarm. The security system may be automatically updated.

At 168, the system monitors whether the responder has acknowledged the alarm. If the responder fails to acknowledge the alarm within a predetermined time period, the alarm is automatically escalated to a monitoring post at 170.

If the responder acknowledges the alarm, a second trigger is activated at 172 to track the time it takes the responder to arrive at the location of the alarm. At 174, the system monitors whether the responder has arrived at the location of the alarm. In some embodiments, arrival of is measured based on a message initiated by the responder. In one embodiment, the arrival message is sent by the responder over the responder's mobile alarm device.

In certain embodiments, the arrival time of the responder is measured using location determination of the responder. In one embodiment, the responder's location may be measured based on tracking the location of the responder's mobile alarm device. Tracking of the location of the responder's mobile alarm device may be carried out by various methods, including the methods described below relative to FIG. 4 and FIG. 5.

If the responder fails to arrive at the location of the alarm within a predetermined time period, the alarm is automatically escalated to the monitoring post at 176. If the responder arrives at the location of the alarm with the predetermined time period, a third timer is triggered at 180. The third timer may monitor whether the responder determines the cause of the alarm and clears the event within a predetermined period. At 182, the system monitors whether the alarm has been cleared within the predetermined time limit. If the responder fails to determine the cause of the alarm or clear the event within a predetermined time period, the alarm is automatically escalated to the monitoring post at 184. If the responder determines the cause of the alarm and cleared the event within the predetermined time period, the alarm is reported as cleared at 186.

The predetermined time periods for meeting response triggers, such as described above, may vary from embodiment to embodiment, trigger to trigger, and site to site. In some embodiments, response trigger time limits are set by a user of the system, such as a supervisor. In some embodiments, the time limit is based on criticality of an alarm (for example, a response to an alarm at a high security facility may require a faster response time). Criteria for responding to triggers may be based on a standard, such as an industry standard or municipal standard, for responding to a particular event, such a security breach or fire.

In certain embodiments, response time limits, staffing levels, or both, may be adjusted based on measured responder performance, as measured by the system. Performance reports may be generated based on the information collected by an automated alarm response system.

Although in embodiments described relative to FIG. 2, three events are timed to monitor the responder's actions, a system may in various embodiments time any number of events. In certain embodiments, a system times only the time for a responder to acknowledge the alarm.

In some embodiments, a mobile alarm device is associated with a position or role, rather than a specific individual. For example, a particular mobile alarm device may be associated with the guard on duty at a particular guard station, which will change from shift to shift.

Network System with Mobile Alarm Devices

Figure 3:
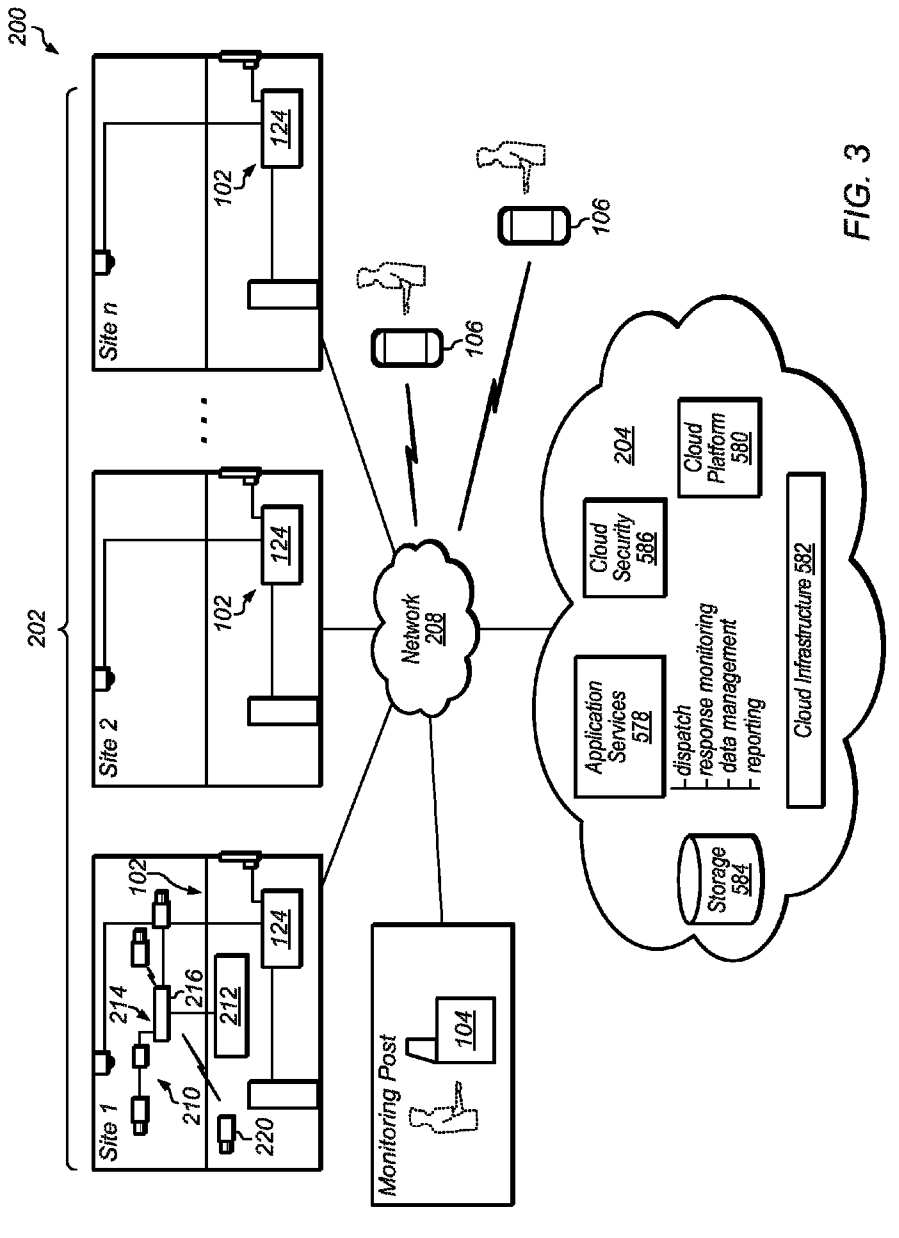
FIG. 3 illustrates one embodiment of a system including multiple sites with alarm connected to a network with mobile alarm devices.

In some embodiments, a system dispatches responders to alarm systems at multiple sites over a network. FIG. 3 illustrates a system including multiple sites with alarm connected to a network with mobile alarm devices. System 200 includes sites 202, cloud computing system 204, monitoring post 112, and mobile alarm devices 106. Each of sites includes one or more site alarm systems 102. Site alarm system 102, cloud computing system 204, monitoring post 112, and mobile alarm devices 106 are connected to one another over network 208. Application services 578 may perform dispatch of responders with mobile alarm devices 106 to alarms triggered at sites 202. In some embodiments, dispatch of responders having mobile alarm devices 106 is carried out in the manner described above relative to FIG. 1 or FIG. 2. In some embodiments, an alarm management database is stored in cloud storage 584.

Network 208 may include any suitable data network or combination of networks that allow the exchange of information among devices in system 200. For example, network 108 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of network 208 may encompass the network infrastructure commonly referred to as the Internet. In other embodiments, network 208 may be entirely contained within an enterprise and not directly accessible from the Internet.

Any or all of sites 202 may include video surveillance systems 210. Video surveillance system 210 may include network video recorder 212, cameras 214, and network switch 216. Cameras 214 include closed circuit television cameras 218 and wireless cameras 220. Closed circuit television cameras 218 and wireless cameras 220 are coupled to network video recorder 212 by way of network switch 216.

Closed circuit television cameras 218 and wireless cameras 220 capture video at site 202. Closed circuit television cameras 218 and wireless cameras 220 may be placed at various locations at the site. In some embodiments, video recording system 210 is a surveillance system for a site. Closed circuit television cameras 218 and wireless cameras 220 may be security cameras.

Cameras in a video recording system may be any of various types, including closed circuit television ("CCTV"), internet protocol ("IP") camera, wireless IP camera, analog camera, pan-tilt-zoom camera, or dome camera.

Cameras 214 may be connected to network video recorder 212 over any suitable medium, such as electrical or optical cable, or via any suitable wireless standard such as IEEE 802.11 ("Wi-Fi"), IEEE 802.16 ("WiMax"), etc. Closed circuit television cameras 118 may be analog, digital, or combination of both. In some embodiments, cameras include an analog camera coupled to an encoder. The encoder may convert an analog signal from an analog camera to a digital signal. The output from the encoder may be fed to network video recorder 212 by way of network switch 216.

Network video recorder 212 may store video data acquired from closed circuit television cameras 218 and wireless cameras 220. In some embodiments, network video recorder 112 compresses video data acquired by closed circuit television cameras 218, wireless cameras 220, or both. In some embodiments, compression is performed in accordance with a standard, such as H.264 or MPEG-4. In certain embodiments, video data is further compressed prior to being transferred to a remote storage location over a network.

Video data acquired using cameras 214 may be encoded and processed. Encoding and processing of video data may be carried out in the camera devices, in the network video recorder, in another device, or combination thereof.

Various system architectures may be employed in cloud computing system 204. Systems and components of cloud computing system 204 may be at a single physical location, such as a data center, or distributed among any number of locations. Cloud computing system 204 includes cloud application services 578, cloud platform 580, cloud infrastructure 582, cloud data storage 584, and cloud security 586. Examples of application services 578 include responder dispatch, alarm response monitoring, alarm system masking management, alarm system testing, computing services, remote data storage services, and workflow management. Cloud application services 578 may access cloud data storage 582.

Proximity Detection

In some embodiments, the location of a participant is measured by tracking the location of the participant's mobile alarm device. In some embodiments, location tracking of a mobile alarm device is performed using geographic location technology provided on the participant's mobile alarm device. Examples of geographic tracking technology include geocoding and global position system ("GPS") technology.

In some embodiments, a participant's location detection in accomplished by detecting the mobile alarm device in proximity with a device located at the site. For example, in one embodiment, a site includes one or more bar code reading devices. Each responder's mobile alarm device may include a bar code. When the participant arrives at the site, the participant may swipe the bar code on the mobile alarm device across the bar code reader. The bar code reader may the information from the bar code. The system may use the bar code information to confirm that the participant is at the site. Other detection devices that may be used to detect and identify a participant may include Bluetooth devices and RFID devices.

In some embodiments, proximity detection is used to verify that a responder is at the site, or that at responder is in the proximity of a particular location at the site. In some embodiments, the system determines whether a responder is in proximity with one or more alarm sensors that have been caused an alarm to be triggered at the site.

Figure 4:
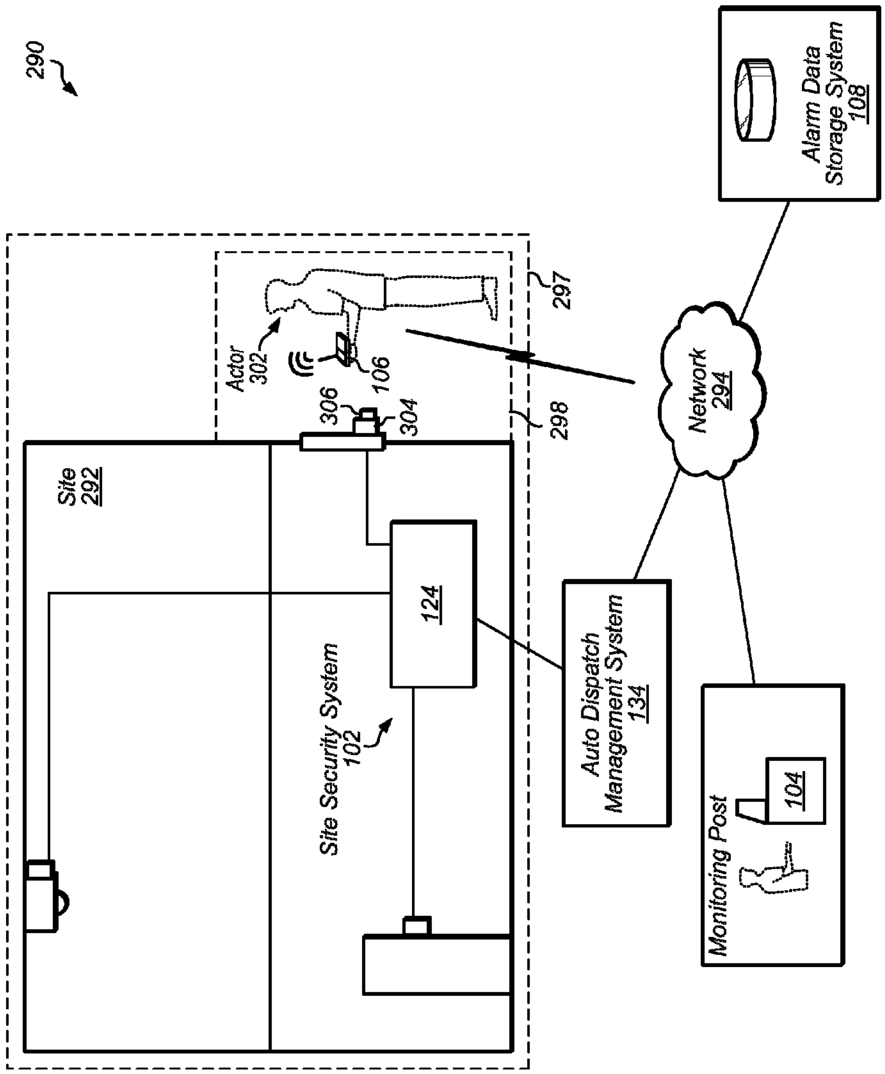
FIG. 4 illustrates one embodiment of a system that allows proximity detection of actors with mobile alarm devices.

FIG. 4 illustrates a system that allows proximity detection of actors with mobile alarm devices. System 290 includes site 292, network 294, auto dispatch management system 134, and alarm data storage system 108. Site 292 includes site security system 102. Site security system includes window contact sensor 304. Sensor identifier tag 306 is located on or near window contact sensor 306. Actor 302 may be, in some embodiments, an alarm responder.

When actor 302 arrives at site 110 to respond to an alarm triggered by window contact sensor 304, the system may signals or messages mobile alarm device 106 to establish proximity of actor 302 to window contact sensor 304. In some embodiments, sensor identifier tag 306 is a bar code at or near window contact sensor 304. In other embodiments, the proximity of mobile alarm device relative to site 292 is determined using location technology such as geocoding or global positioning system.

Bar codes may be located, in one example, in particular locations in a building (for example, main entry, floor 1 entry, floor 2 entry). In some embodiments, bar code indicators are located at or near alarm system components sensors (for example, control panel #3, window contact sensor #23*a*).

Figure 5:
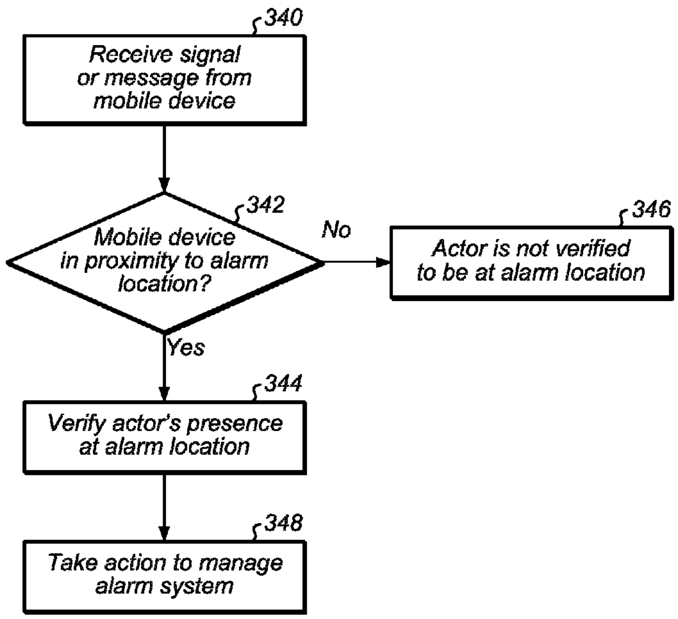
FIG. 5 illustrates one embodiment of detecting proximity of an actor to an alarm location using mobile alarm devices.

FIG. 5 illustrates one embodiment of detecting proximity of an actor to an alarm location (such as a site or an alarm system or alarm sensor location) using mobile alarm devices. At 340, a signal or message is received from a mobile device. The mobile device may be in the possession of the actor. The signal may be received over a network, such as network 294 described above relative to FIG. 4. In one embodiment, the signal or message includes bar code information obtained from scanning an object at an alarm location. In other embodiments, the signal or message includes geo-coding information.

At 342, an assessment is made whether the mobile device is in proximity with an alarm location. Examples of alarm locations for determining proximity may include a site, a building, or door entry, or the location of a particular alarm sensor. In some embodiments, an assessment of proximity includes determining whether the mobile alarm device is within a predefined range or zone or not (for example, with respect to FIG. 4, whether the mobile alarm device is within alarm site zone represented by box 297, or within alarm sensor zone represented by box 298). In certain embodiments, an assessment of proximity includes quantifying the distance of a mobile alarm device from an alarm location (for example, Responder A is 200 meters from the alarm sensor). If it is determined that the mobile device is in proximity with the alarm location, the actor's presence at the location may be verified at 344. A determination that the mobile device is in proximity with the alarm location may be used, for example, to verify the arrival of a responder to the location of an alarm. If it is not determined that the mobile device is not in proximity to the alarm location, the actor's presence may remain unverified at 346.

At 348, an action, after verification of the actor's presence at the alarm location, one or more actions may be taken to manage the alarm system. Examples of actions that may be taken may include masking an alarm, initiating a timer to measure the time to clear of the alarm, or initiating a test of the alarm system (including, for example, a particular sensor in the alarm system at the actor's location).

Masking

Figure 6:
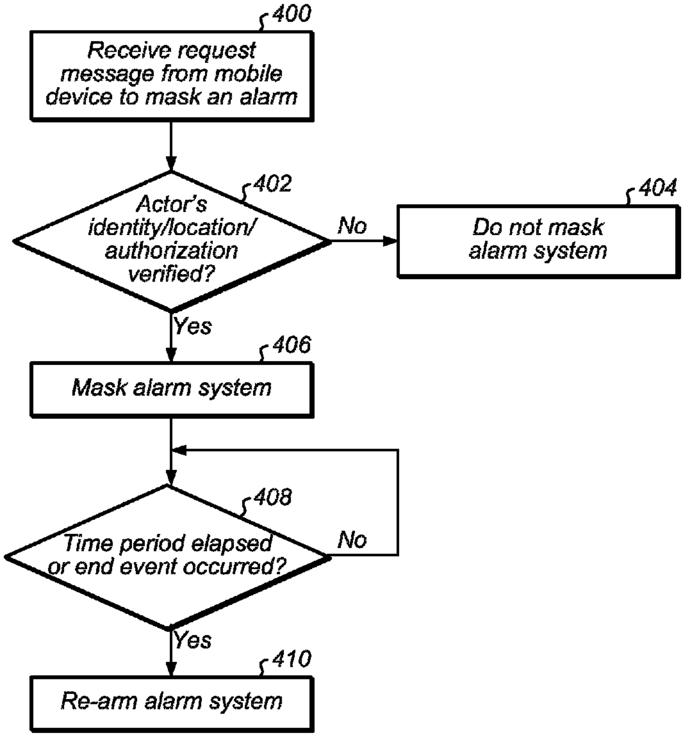
FIG. 6 illustrates one embodiment of masking an alarm using a mobile alarm device.

In some embodiments, a participant instructs a system to disable or suspend an alarm. FIG. 6 illustrates one embodiment of masking an alarm. At 400, a request to mask an alarm may be received from a mobile alarm device. The request message may be received over a network. The request may be received, for example, from a supervisor at the site. The request may specify a time period for the mask to be in effect.

In some embodiments, the supervisor's level of authority to request the mask may be checked. At 402, the identity of the actor initiating the alarm may be checked. In one embodiment, the identity of the actor is checked by having the actor swipe the actor's badge over the scanning device in the mobile alarm device, such as an RFID reader. In some embodiments, the actor's location may be checked. In certain embodiments, for example, the proximity of the mobile alarm device for the request message is established by proximity detection, such as described above relative to FIG. 4 and FIG. 5. If any of the verifications fail, masking may be declined at 404. If all of the verifications are made, the alarm system (or the requested portion thereof, such as a particular sensor) may be masked at 406.

At 408, the system may monitor whether the predetermined time period for the mask has been met or whether any predefined mask-ending events has occurred. If the time limit has been met or a pre-defined end event has occurred, the alarm system may be automatically re-armed at 410. In some embodiments, a system is automatically re-armed upon the earliest to occur of the predetermined time period elapsing or a pre-determined event. In some cases, the system may monitor for an event to occur, upon which event the system may be automatically re-armed. For example, if a door alarm is masked for 20 minutes to allow the door to be opened to receive a shipment, the system may monitor when the door is closed, and re-arm the alarm system upon closure of the door, even if it has been only 15 minutes since the mask was initiated. In some cases, the supervisor may re-arm the system prior to the time limit being met.

Testing

Figure 7:
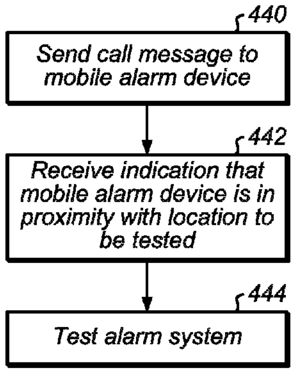
FIG. 7 illustrates one embodiment of testing an alarm using a mobile alarm device.

In some embodiments, an alarm system is tested using one or more mobile alarm devices. FIG. 7 illustrates one embodiment of testing an alarm using a mobile alarm device. At 440, a call message is sent over a network to a mobile alarm device. The call message may call a responder with the mobile alarm device to go to one or more locations of the alarm system at a site. At 442, an indication that the mobile alarm device is in proximity the alarm system location is received. In some embodiments, the indication is a message sent by the responder that the responder has arrived at the location. In other embodiments, the proximity of the mobile alarm device is established by proximity detection, such as described above relative to FIG. 4 and FIG. 5. In certain embodiments, a test may be initiated at the site by a user with a mobile alarm device (based, for example, on conditions or events at the site), rather than initiated from a remote location.

At 444, after the mobile alarm device is in proximity with location, tests may be performed on the alarm system. The actor with the mobile alarm device may take actions in response to the alarm. For example, replace, repair, or reset an alarm system component. In some embodiments, a program may be carried out in which various different components of an alarm system are tested over period of time (for example, 60 day test period).

Mobile Alarm Device User Interface

In some embodiments, an alarm system operator, such as a responder or supervisor, interacts with an alarm system by way of a mobile alarm device. Through the mobile alarm device, the operator may submit acknowledgment instructions, clear alarms, and acquire, send, and receive media such as photographs and video. FIGS. 8-11 illustrate embodiments of screen displays for a mobile alarm device.

Figure 8:
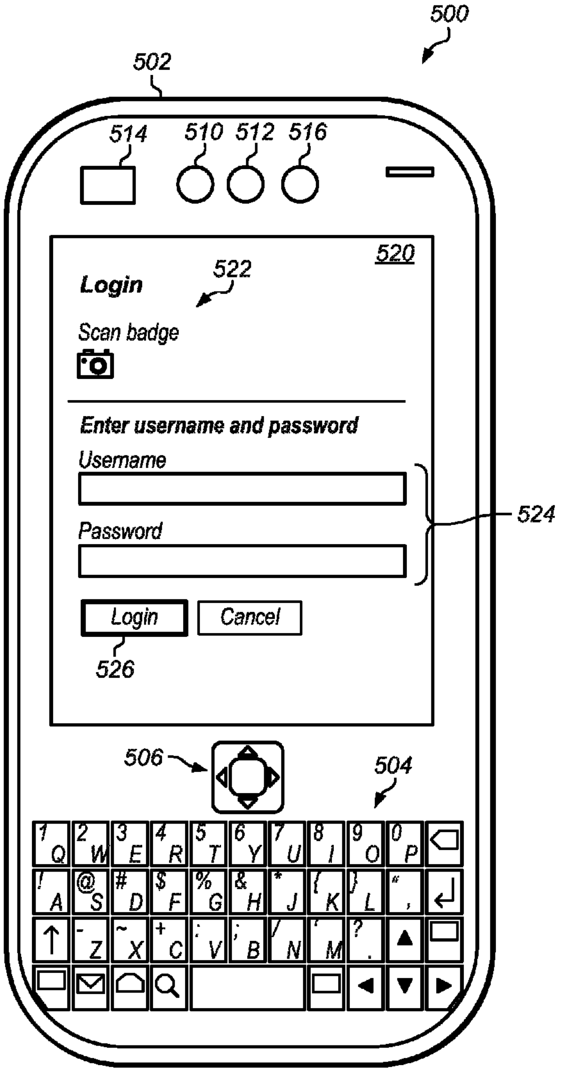
FIG. 8 illustrates a mobile alarm device including a login screen according to one embodiment.

FIG. 8 illustrates a mobile alarm device including a login screen according to one embodiment. Mobile alarm device 500 includes case 502, keyboard 504, scroller device 506, and display 508. Mobile alarm device may include various internal components for operating the mobile alarm device, such as a processor, a battery, a SIM card. In some embodiments, display 508 includes a touch screen. Each mobile alarm device may be assigned a unique identifier code.

Although the mobile alarm device illustrated in FIG. 8, mobile alarm device 500 is shown with a qwerty-type keyboard and a scroller device, a mobile alarm device may in some embodiments include other user input devices, such as a keypad (such as a phone-type alphanumeric keypad) or buttons.

Mobile alarm device 500 includes front-facing camera 510, barcode scanning sensor 512, mobile alarm device barcode 514, and RFID scanning sensor 516. Mobile alarm device 500 may also include a rear-facing camera. Cameras on mobile alarm device 500 may be used to acquire photographs and video with mobile alarm device 500. Mobile alarm device 500 may send media files and video feeds from mobile devices to a monitoring post or other systems on a network.

Barcode scanning sensor 512 and RFID scanning sensor 516 may be used to acquire codes or other information from objects that an actor with mobile alarm device 500 encounters during alarm-related operations. Mobile alarm device 500 may send information scanned from barcode indicators to a response management system, a monitoring system at a monitoring post, or other mobile alarm devices.

In FIG. 8, login screen 520 is displayed in display 508. Login screen 520 may include user interface elements for authenticating a user on mobile alarm device 500. Login screen 520 includes authentication menu 522, login entry fields 524, and login submit key 526. The user may select one or more authentication options from authentication menu 522. In some embodiments, a user scans the user's badge using RFID scanning sensor 526. Authentication information may be sent over the network. Access may be granted to the system following authentication. In some embodiments, different users have different levels of access, depending on the user's position. For example, a responder may have one level of access, and a supervisor may have a different level of access.

In some embodiments, a user acquires an image using one of the cameras on mobile alarm device 500. The image may be, for example, the face of the user or an item at the location of the user.

In some embodiments, two or more operators of alarm systems have mobile alarm devices. Operators may exchange information relating to alarms over a network using the devices. For example, two responders may exchange information relating to alarms at one or more sites. In some embodiments, a user may assign or re-assign particular alarms to different responders. For example, a supervisory responder may use a mobile alarm device to reassign a particular alarm from Responder A to Responder B.

Figure 9:
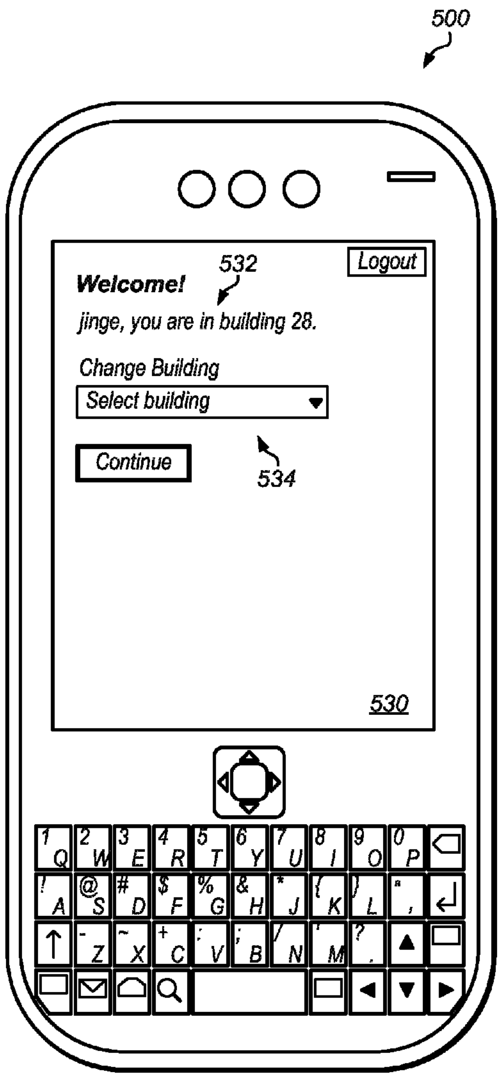
FIG. 9 illustrates a building selection window for a mobile alarm device according to one embodiment.

FIG. 9 illustrates a building selection window for a mobile alarm device according to one embodiment. Building selection window 530 includes building status indicator 532 and building select menu 534. Upon login, the user may be given the option to change buildings using building select menu 534. Changing the selected building may allow the user to access information about various buildings at a site.

Figure 10:
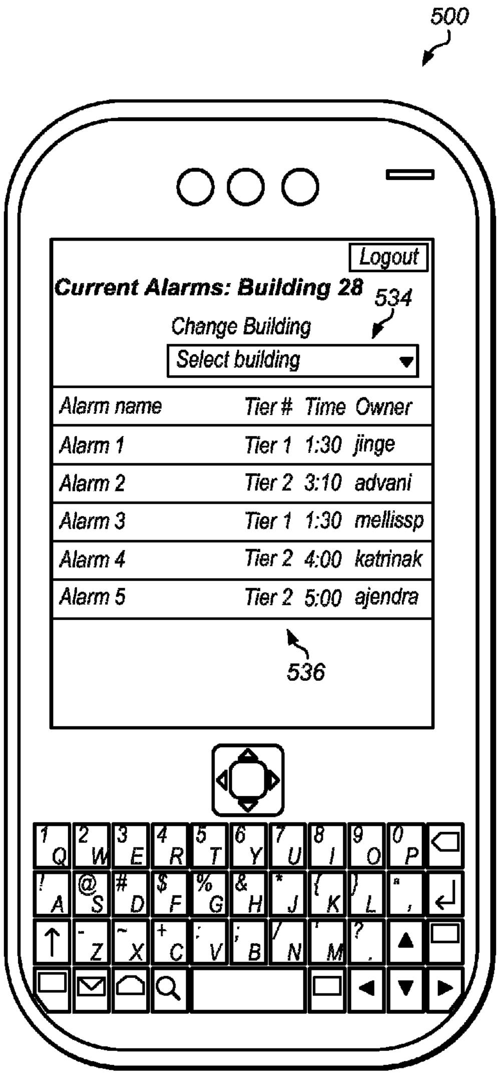
FIG. 10 illustrates site alarm information window for a mobile alarm device according to one embodiment.

In some embodiments, a mobile alarm device may display information relating to all of the alarms at a site. FIG. 10 illustrates site alarm information window for a mobile alarm device according to one embodiment. Alarm information window 536 includes building select menu 534 and alarm list 536. Alarm list 536 may include a listing of the alarms that have been triggered at a site or building. For each alarm listed, alarm information window 536 information for the alarm, including the time of the alarm, criticality, owner, and current status.

In some embodiments, a call message is sent from the system to a user over mobile alarm device 500. The user may receive an audible message, a message on display 508, a vibration, or combination thereof. The user may be prompted to accept the alarm on display 508. In some embodiments, a responder may be prompted to accept an alarm within alarm list 536 shown in FIG. 10.

Figure 11:
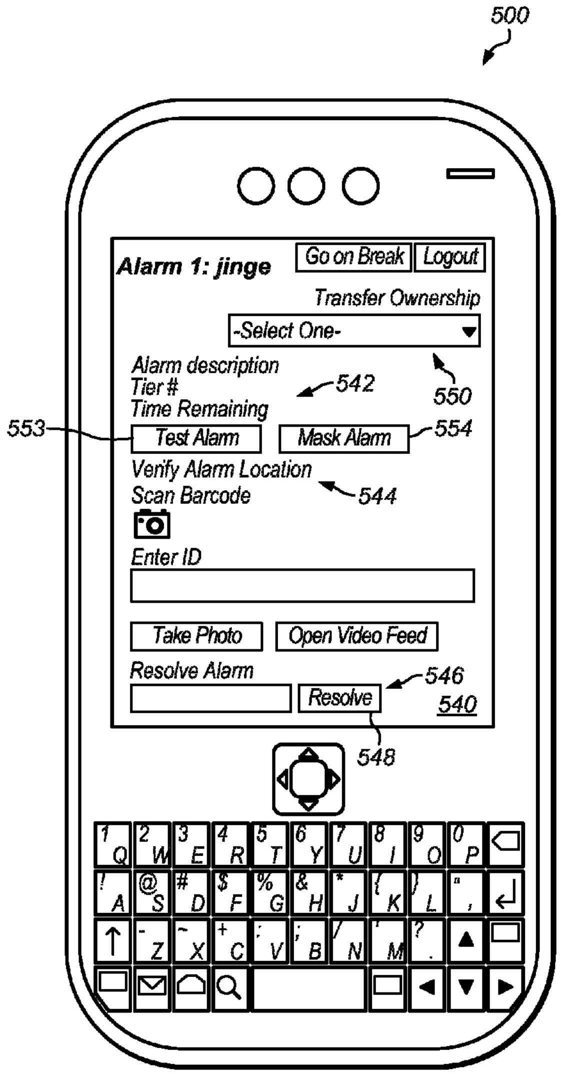
FIG. 11 illustrates an alarm management window for a mobile alarm device according to one embodiment.

FIG. 11 illustrates an alarm management window for a mobile alarm device according to one embodiment. Alarm management window 540 includes alarm status panel 542, alarm verification panel 544, and alarm resolution panel 546. In some embodiments, alarm management window 540 is presented to a responder for an alarm that has been accepted by the responder.

Alarm status panel 542 includes information about an alarm, including location, nature of the alarm, and criticality. In some embodiments, timing information is displayed, such as when the alarm occurred or a deadline for resolving the alarm. In some embodiments, time remaining to take an action (accept the alarm, arrive at the site of the alarm, or resolve the alarm), is presented in the display. In certain embodiments, a countdown timer is displayed for one or more actions to be taken.

Alarm verification panel 544 may allow a user to verify an alarm or actions taken with respect to the alarm. For example, a responder may use mobile alarm device 500 to scan a barcode at the location of the alarm (for example, a bar code on a door associated with the alarm location), take images of the alarm location, or enter an identification number. In some embodiments, a responder's arrival or physical presence at the alarm site or at the location of the alarm is verified based in information received from the mobile alarm device.

A responder may resolve the alarm in alarm resolution panel 546. In some embodiments, the responder may enter comments related to the alarm, such as "door left open". When the alarm is resolved, the user may click on resolve button 548.

In some embodiments, a user can acquire still images or video images from mobile alarm device 500. Images may be displayed to the responder, stored, or sent to an automatic alarm management system. In certain embodiments, still or video images acquired on a mobile alarm device are fed to personnel at a monitoring post.

In some embodiments, a responder may receive a feed from another source of images, such as a network video recorder of a surveillance system. Images may be received from a surveillance system in real-time feed, or images retrieved from storage.

Alarm management window 540 may allow a user to take actions relating to the resolution of alarms. For example, a responder may transfer ownership to another responder using transfer menu 550. A responder may notify the system that the responder is going on break by selecting button 552. The system may recognize that the responder is on break and not send alarms to the responder until the responder indicates over the mobile alarm device that the responder has returned from the responder's break.

Alarm management window 540 includes test alarm button 553 and mask alarm button 554. Test alarm button 553 may be used during testing of alarm systems by responders. Mask alarm button 554 may be used during masking of alarm systems, such as masking initiated by a supervisor as described herein. In some embodiments, a time remaining countdown timer is provided for a masking event to indicate the amount of time until an alarm system is re-armed.

In some embodiments, data acquired with video surveillance system may be used in responses to an alarm system. For example, during a response to an alarm at a site, real-time or recorded video from video surveillance system 102 shown in FIG. 3 may be displayed to a responder on mobile alarm device 106, to monitoring personnel at monitoring post 104, or both.

In various embodiments described above, mobile devices have been described in the context of managing responses to alarms from a security system at a fixed location. Various systems and components described herein may, nonetheless, be used in various embodiments in a variety of other applications, including retail, marketing, traffic monitoring, traffic control, law enforcement, logistics management, consumer media, and utilities monitoring.

Example Service Provider Networking Environments

Various embodiments may be implemented in the context of a service provider that provides response management and other resources to multiple customers. A service provider may provide resources to the customers via one or more services that allow the customers to purchase, rent, or otherwise obtain instances of resources, including but not limited to computation and storage resources, implemented on devices within a service provider network or networks in one or more service provider data centers. The following section describes example service provider network environments in which above-described embodiments of the methods and apparatus for managing responses to alarms may be implemented. These example service provider network environments are not, however, intended to be limiting.

Figure 12:
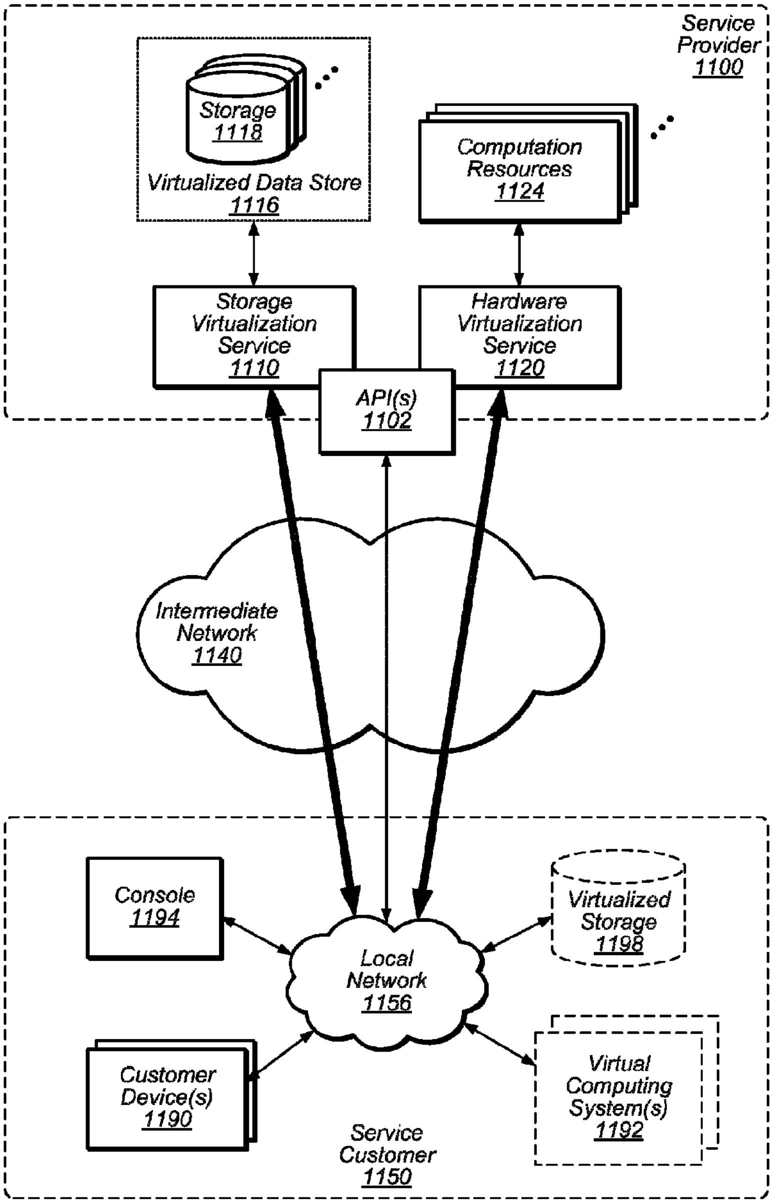
FIG. 12 is a block diagram of an example service provider that provides a storage virtualization service and a hardware virtualization service.

FIG. 12 is a block diagram of an example service provider that provides a storage virtualization service and a hardware virtualization service to customers, according to some embodiments. Hardware virtualization service 1120 provides multiple computation resources 1124 (e.g., VMs) to customers. The computation resources 1124 may, for example, be rented or leased to customers of the service provider 1100 (e.g., to service customer 1150). Each computation resource 1124 may be provided with one or more private IP addresses. A local network of service provider 1100 may be configured to route packets from the private IP addresses of the computation resources 1124 to public Internet destinations, and from public Internet sources to the computation resources 1124.

Service provider 1100 may provide a service customer 1150, for example coupled to intermediate network 1140 via local network 1156, the ability to implement virtual computing systems 1192 via hardware virtualization service 1120 coupled to intermediate network 1140 and to the local network of service provider 1100. In some embodiments, hardware virtualization service 1120 may provide one or more APIs 1102, for example a web services interface, via which a service customer 1150 may access functionality provided by the hardware virtualization service 1120, for example via a console 1194. In at least some embodiments, at the service provider 1100, each virtual computing system 1192 at customer 1150 may correspond to a computation resource 1124 that is leased, rented, or otherwise provided to service customer 1150.

From an instance of a virtual computing system 1192 and/or another customer device 1190 or console 1194, the customer may access the functionality of storage virtualization service 1110, for example via one or more APIs 1102, to access data from and store data to a virtual data store 1116 provided by the service provider 1100. In some embodiments, a virtualized data store gateway (not shown) may be provided at the service customer 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another customer device 1190, may mount and access virtual data store 1116 volumes, which appear to the user as local virtualized storage 1198.

While not shown in FIG. 12, the virtualization service(s) may also be accessed from resource instances within the service provider 1100 network via API(s) 1102. For example, a customer, appliance service provider, or other entity may access a virtualization service from within a respective private network on the service provider 1100 network via an API 1102 to request allocation of one or more resource instances within the private network or within another private network.

In at least some embodiments, a service provider may also provide, or may allow a third party to provide, load balancer services. For example, a client may launch some number of resource instances (e.g., computation resources or storage resources) in the service provider network, and instruct the load balancer service to place a load balancer in front of the resource instances. The load balancer may then distribute incoming traffic across the resource instances behind the load balancer.

Illustrative System

Figure 13:
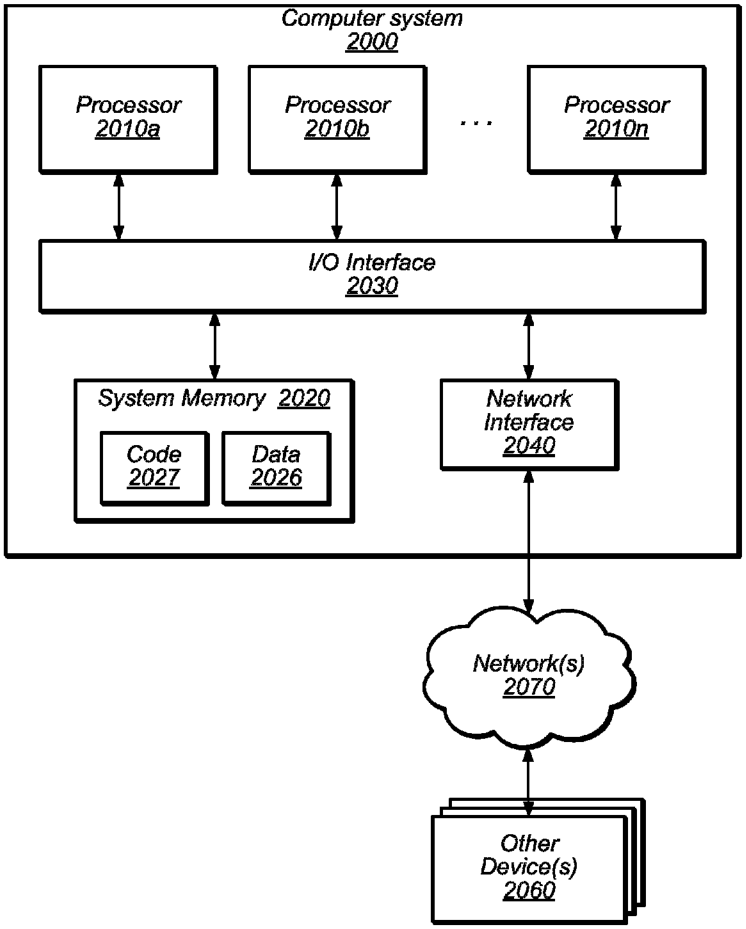
FIG. 13 illustrates one embodiment of a computer system that can be used to manage alarm responses in some embodiments.

In some embodiments, a server that implements a portion or all of one or more of the technologies, including but not limited to the various service provider methods and apparatus and the methods and apparatus for remote video data storage as described herein, may include a general-purpose computer system that includes or is configured to access one or more computer-accessible media, such as computer system 2000 illustrated in FIG. 13. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for transferring data over a network, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 12, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data for implementing embodiments of data transfer and storage methods as described above relative to FIGS. 1-7. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A method of responding to an alarm, comprising:
performing, by one or more computing devices:
receiving an alarm message, wherein the alarm message indicates that an alarm has been triggered at a site;
in response to receiving the alarm message:
automatically identifying one or more responders or mobile alarm devices to call to respond to the alarm, and
automatically sending, over a network, one or more call messages for the alarm to one or more mobile alarm devices;
automatically receiving, from at least one responder, over at least one of the mobile alarm devices, an acceptance of the call message for the alarm; and
automatically escalating the alarm if a responder who accepted the call message has not cleared the alarm within a predetermined time period.

2. The method of claim 1, wherein the responder or the mobile alarm device receiving the call message is the responder or mobile alarm device that is responsible for responding to alarms at the site at the time the alarm was triggered.

3. The method of claim 1, further comprising automatically displaying the call message on at least one of the one or more mobile alarm devices.

4. The method of claim 1, wherein automatically identifying the one or more responders or mobile alarm devices comprises retrieving information for the responder or the mobile alarm device from one or more databases.

5. The method of claim 1, wherein receiving the alarm message comprises intercepting an alarm message intended to be sent to a monitoring post.

6. The method of claim 5, wherein the intercepted alarm message from the site is not received by the monitoring post.

7. The method of claim 1, further comprising sending an alarm message to a monitoring post based on the alarm message received from the site.

8. The method of claim 1, further comprising automatically receiving acceptance of the call message from at least one responder over a mobile alarm device.

9. The method of claim 1, further comprising automatically monitoring a time for a responder to accept the call message for the alarm.

10. The method of claim 1, further comprising escalating a call message if a responder has not accepted the call message for the alarm within a predetermined time period.

11. The method of claim 1, further comprising automatically receiving notification of arrival at a location of the alarm from a responder who accepted the alarm.

12. The method of claim 1, further comprising automatically monitoring a time for a responder who accepted the alarm to arrive at a location of the alarm.

13. The method of claim 1, further comprising escalating the alarm if a responder who accepted the call message has not arrived at the location of the alarm within a predetermined time period.

14. The method of claim 1, further comprising automatically receiving notification of clearance of the alarm from a responder who accepted the alarm.

15. The method of claim 1, further comprising automatically monitoring a time for a responder who accepted the alarm to clear the alarm.

16. The method of claim 1, further comprising initiating a timer to monitor at least one time to respond for the alarm based on one or more predetermined time limits, wherein at least one of the predetermined time limits is adjustable by at least one user.

17. The method of claim 1, further comprising verifying proximity of at least one responder based on information received from at least one mobile alarm device.

18. A system for managing responding to alarms, comprising:
a processor;
a memory coupled to the processor and configured to store program instructions executable by the processor to implement:
receiving an alarm message, wherein the alarm message indicates that an alarm has been triggered at a site;
in response to receiving the alarm message:
automatically identifying one or more responders or mobile alarm devices to call to respond to the alarm, and
automatically sending, over a network, one or more call messages for the alarm to one or more mobile alarm devices;
automatically receiving, from at least one responder, over at least one of the mobile alarm devices, an acceptance of the call message for the alarm; and
automatically escalating the alarm if a responder who accepted the call message has not cleared the alarm within a predetermined time period.

19. A non-transitory computer-readable storage medium, storing program instructions computer-executable on one or more computers to implement:
receiving an alarm message, wherein the alarm message indicates that an alarm has been triggered at a site;
in response to receiving the alarm message:
automatically identifying one or more responders or mobile alarm devices to call to respond to the alarm, and
automatically sending, over a network, one or more call messages for the alarm to one or more mobile alarm devices;
automatically receiving, from at least one responder, over at least one of the mobile alarm devices, an acceptance of the call message for the alarm; and
automatically escalating the alarm if a responder who accepted the call message has not cleared the alarm within a predetermined time period.

20. A method of responding to an alarm, comprising:
performing, by one or more computing devices:
receiving an alarm message, wherein the alarm message indicates that an alarm has been triggered at a site;
in response to receiving the alarm message:
automatically identifying one or more responders or mobile alarm devices to call to respond to the alarm, and automatically sending, over a network, one or more call messages for the alarm to one or more mobile alarm devices;

automatically receiving, from at least one responder, over at least one of the mobile alarm devices, an acceptance of the call message for the alarm; and automatically initiating a timer to monitor at least one time to respond for the alarm based on one or more predetermined time limits, wherein at least one of the predetermined time limits is adjustable by at least one user.

* * * * *